S. CLEVENGER.
Harvester Rakes.
No. 141,695. Patented August 12, 1873.
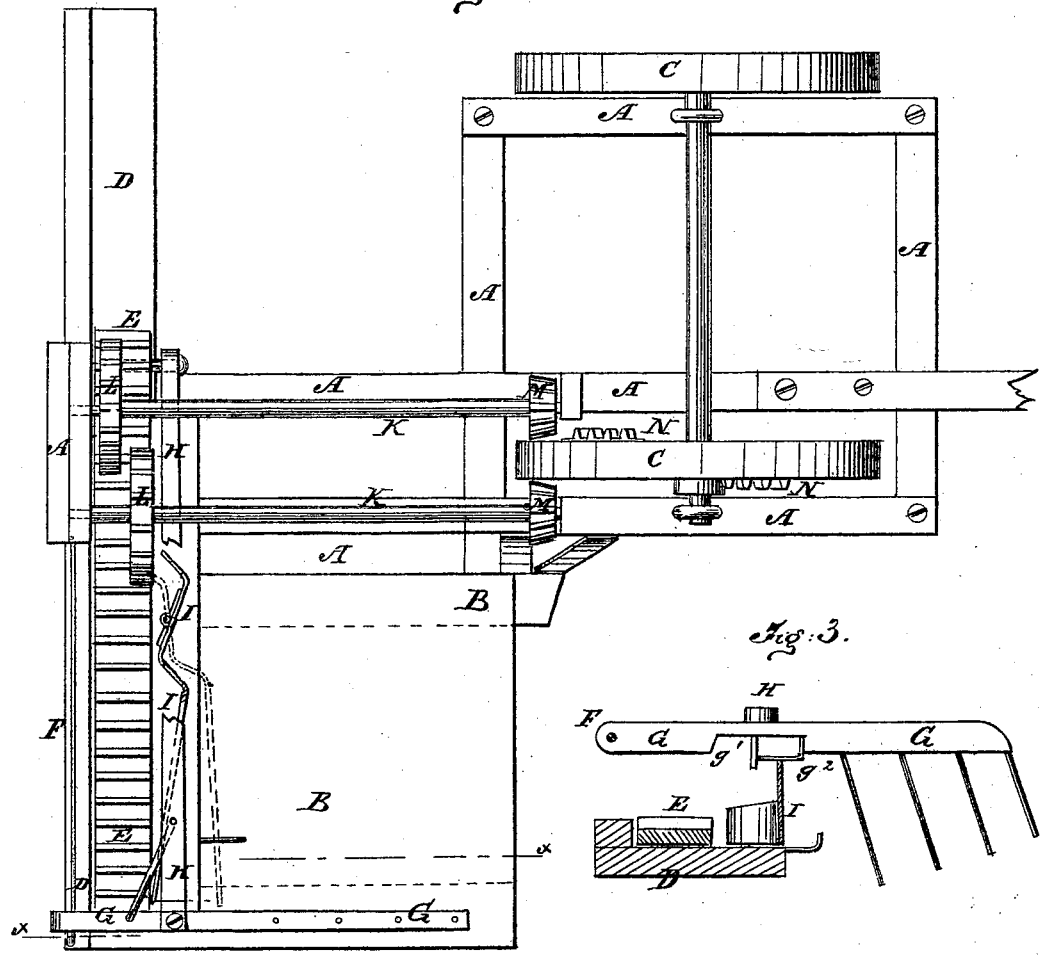
Witnesses:
Inventor:
Per
Attorneys.

UNITED STATES PATENT OFFICE.

SAMUEL CLEVENGER, OF VIBBARD, MISSOURI.

IMPROVEMENT IN HARVESTER-RAKES.

Specification forming part of Letters Patent No. 141,695, dated August 12, 1873; application filed July 5, 1873.

*To all whom it may concern:*

Be it known that I, SAMUEL CLEVENGER, of Vibbard, in the county of Ray and State of Missouri, have invented a new and useful Improvement in Automatic Rake for Harvesters, of which the following is a specification:

Figure 1 is top view of my improved rake, shown as applied to a harvester. Fig. 2 is a detail section of the same taken through the line $x\ x$, Fig. 1, and showing the rake in position for sweeping the grain from the platform. Fig. 3 is the same section as Fig. 2, but showing the rake in position for returning for another stroke. Fig. 4 is a detail view of the guide-plate.

Similar letters of reference indicate corresponding parts.

My invention has for its object to furnish an improved self-rake for harvesters, simple in construction, and reliable and effective in operation, and which will require much less power to operate it than rakes constructed in the ordinary manner. The invention consists in the slide, the toothed bar, the slide-rod, the guide, the rake-head, the rake-bar, the trip-pin, the two shafts, the four gear-wheels, and the two segments of gear-wheels, in combination with each other and with the frame, the platform, and the drive-wheel of a harvester, as hereinafter fully described.

A represents the frame-work, B the platform, and C the drive-wheels of the harvester, about the construction of which parts there is nothing new. To the rear part of the platform B is attached a way or slide, D, in which the toothed bar E slides back and forth. To the rear part of the slide D, or to supports attached to said slide, or to the frame of the machine, is attached a rod, F, which passes through the rear end of the rake-head G, and upon which said rake-head slides back and forth. The rake-head G is attached to the outer end of the bar H, which extends along the slide D and rack-bar E, and its inner end is pivoted to the forward edge of the inner end of the said rack-bar E, so that the said rake-head G may be moved back and forth by and with the said rack-bar E. I is a guide-plate, pivoted to the slide D, and the inner end of which is inclined, so that its outer end may be moved forward and back by a pin, J, attached to the rake-bar H.

By this construction, as the rake-head G begins to move inward to sweep a gavel from the platform B, the guide I enters a notch, $g^1$, in the under side of the rake-head G, which allows the rake-head to drop, so that its teeth may move along the platform B and carry the grain with them. As the rake-head G begins its outward movement, the pin J strikes the inclined inner end of the guide-plate I, and moves its outer end forward, so that the slide $g^2$, attached to the rake-head G, may slide along the said guide I, which raises the forward part of said rake-head, so that it may pass back without its teeth coming in contact with the grain upon the platform B.

K are two parallel shafts, which revolve in bearings attached to the frame A. To the rear ends of the shafts K are attached two gear-wheels, L, the teeth of which mesh into the teeth of the rack-bar E. The shafts K are so arranged that their forward ends may be upon the opposite sides of the rear part of the drive-wheel C, and to said ends are attached small gear-wheels M. N are segments of gear-wheels, which are attached to the opposite sides of the drive-wheel C, in such positions that at each revolution of said drive-wheel C one of the segments N may mesh into one of the gear-wheels M, and move the rake inward to sweep the gavel from the platform B. As the rake completes its stroke, the other segment N meshes into the other gear-wheel M and moves the rake-head outward, ready to sweep another gavel from the platform. By this construction the raking device stands still about six-sevenths of the time, and thus increases the draft only about one-seventh of the time, and even then but slightly.

Having thus described my invention, I claim as new and desire to secure by Letters Patent—

The slide D, the toothed bar E, the slide-rod F, the guide I, the rake-head G $g^1\ g^2$, the bar H, the pin J, the two shafts K, the four gear-wheels L M, and the two segments of gear-wheels N, in combination with each other and with the frame, platform, and drive-wheel of a harvester, substantially as herein shown and described.

SAMUEL CLEVENGER.

Witnesses:
D. G. McDONALD,
S. L. BAY.